Dec. 16, 1958   R. A. LYLE   2,864,205
TOP MOLD UNPLUGGER
Filed Feb. 14, 1957   2 Sheets-Sheet 1

INVENTOR
ROBERT A. LYLE
BY Michael Hertz
ATTORNEY

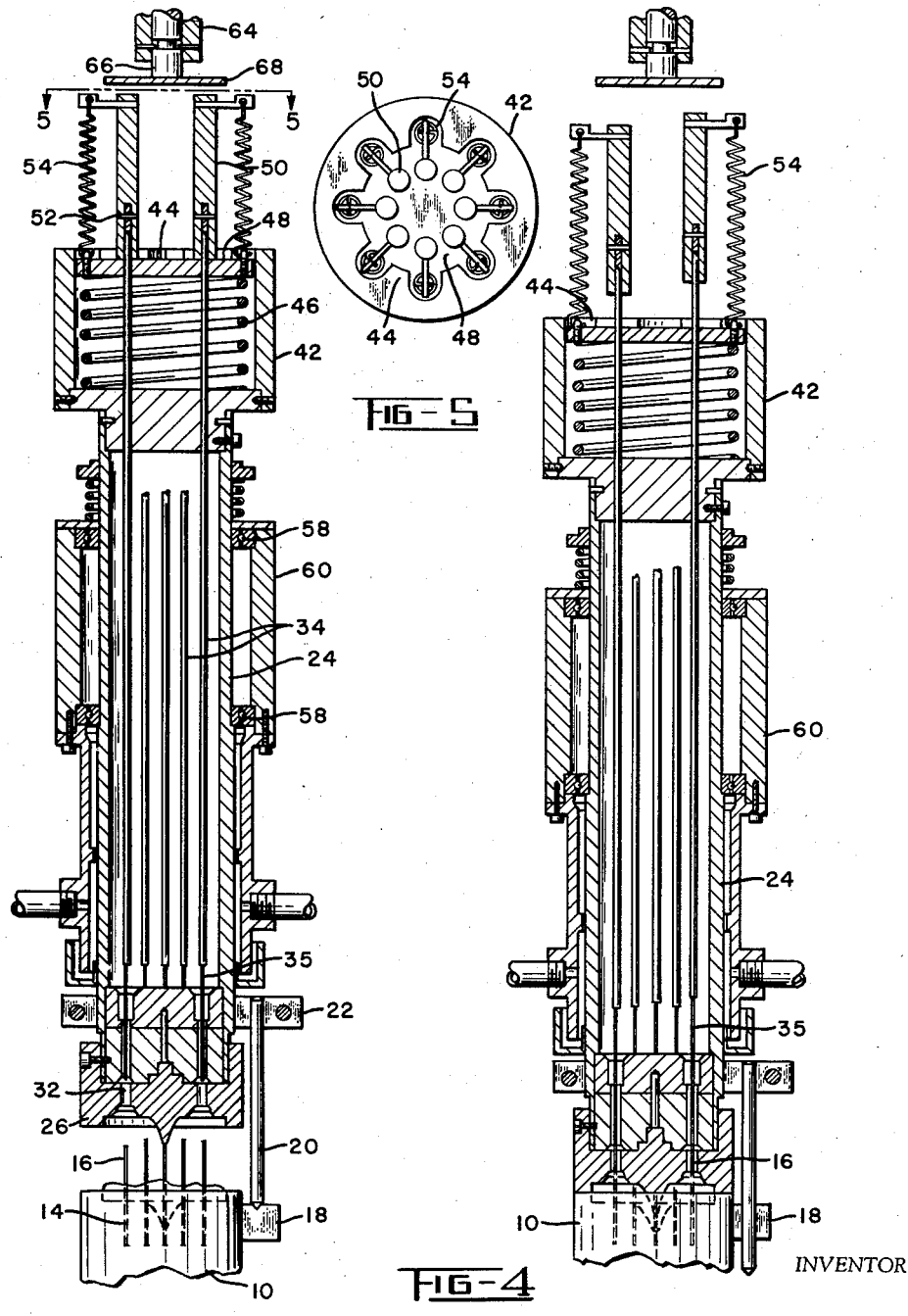

2,864,205

TOP MOLD UNPLUGGER

Robert A. Lyle, Corsica, Pa., assignor to Sylvania Electric Products Inc., a corporation of Massachusetts Application February 14, 1957, Serial No. 640,135

3 Claims. (Cl. 49—66)

This invention relates to means for maintaining bores of press molds free of extraneous materials.

In one form of press used in the manufacture of stems for electronic tubes it is necessary to insert stem leads into a bottom press mold, surround the stem leads with a collar or collet of glass, fuse the glass, and while the glass is fused bring a top press mold down onto the glass to shape the same. The top mold is provided with bores to receive the tops of the stem leads and rods are provided in the top mold which are spring pressed onto the tops of the stem leads to ensure against their floating up into the molten glass and out of seating position in the bottom mold. On withdrawal of the top press mold, it often occurs that some of the stem leads are left in the bore or some of the glass of the stem solidifies in the bores of the top mold causing destructive effects on subsequent stems and therefore necessitating stoppage of the machine for manual clearing out of the bores.

It is an object of the invention to provide for means for automatically stripping the bores of any extraneous material.

It is a further object of the invention to effect such stripping operation after every molding operation of the press.

It is a still further object to provide a bore stripping device of such a character that it may be applied to existing mechanism with very few changes therein.

These and other objects will become apparent upon consideration of the following description when taken in conjunction with the accompanying drawing in which:

Fig. 3 is a similar view but showing the upper press partially lowered.

Fig. 4 is also a similar view but showing the upper press in completely lowered position, and Fig. 5 is a view looking in the direction of the arrows in Fig. 3.

Figures 1, 2:
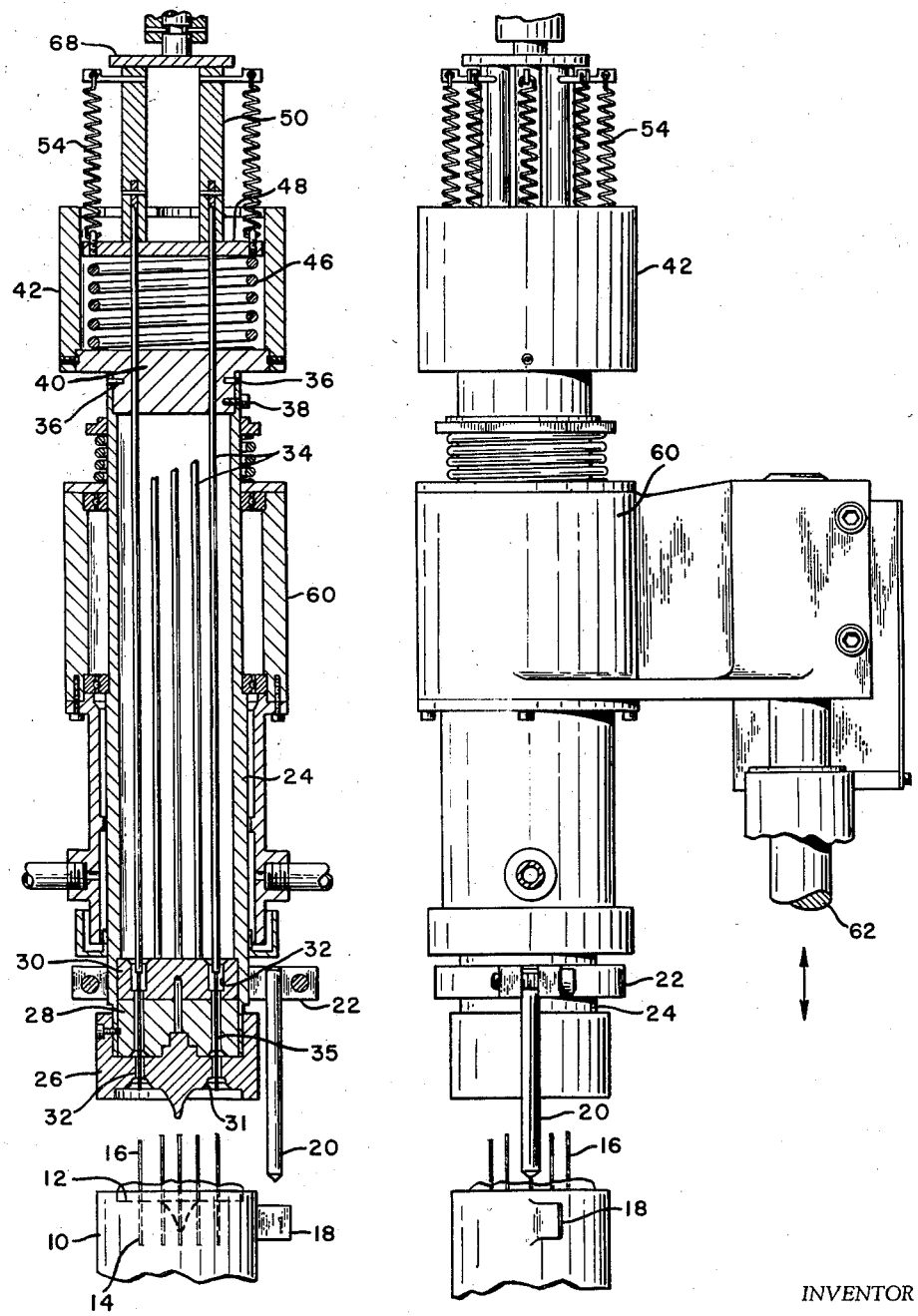
Fig. 1 shows a side view of a portion of the press with the invention embodied therein.
Fig. 2 is a view of the same press portion when the upper press mold is completely raised up above the lower mold, the upper press being shown in section and some of the rods being broken away at the top.

Referring to Figs. 1 and 2, it will be seen that the press comprises a lower mold 10 in which is a recess 12, shown in dotted outline, and provided with bores 14 to seat the leads 16 of a stem. These leads 16 may be of variable lengths and extend to different heights above the bottom mold. For the purposes of illustration the left hand lead 16 is shown shorter than the others. In the conventional machine of the type upon which the improvement of the invention has been made, the lower mold is rotated about its vertical axis so that opposed glass melting flames directed radially of the axis of the lower mold and at the glass collet level may reach every part of the glass and uniformly heat the same. The lower mold is provided with a radial projection 18 for engagement with a finger 20 held in a collar 22 secured to a rotatable sleeve 24 forming part of the upper press. The sleeve at its lower end has keyed to it the upper mold block 26, the same being suitably recessed and contoured to give desired configuration to the top of the glass of the stem when the molds are engaged.

In order to allow space for the leads 16, the mold block 26 and superadjacent filler blocks 28 and 30 are provided with registering bores 32 into which the leads 16 extend as the molds approach each other. To provide for better seal of the glass to the leads and to facilitate entry of the leads into the bores, the lower ends of the bores are usually flared as indicated at 31. The finger 20 is long enough to engage the lug 18 prior to the leads 16 entering the bores 32 and the relative position of lug 18 and the finger 20 is such that registration of the bores 14 in the lower mold and the bores 32 in the upper mold is effected.

In order to ensure the leads 16 being seated in their bores 14, the upper press is provided with a number of longitudinally extending spring pressed rods 34, one for each bore 32, the lower ends 35 of the rods being reduced in size to snugly pass through the bore portions in block 28 and mold 26 and to engage the upper ends of leads 16. Each of these rods, at its upper end passes, freely, through a cap 40 fastened to the upper end of the sleeve 24 by screw means 38 and orientating pins 36 in cap 40 and slots in the upper end of the sleeve. To a flanged portion of the cap is suitably fastened a spring housing 42 in the form of a cylindrical barrel with an inwardly directed scalloped rim 44, as indicated in Fig. 5. Within the housing is a spring 46 reacting between the bottom of the housing and a disc 48. The disc is prevented from being projected out of the housing and by the overhanging scalloped rim. Each of the rods 35 also passes freely through a hole in the disc 48 and is surmounted by an elongated block 50 larger in diameter than the rod and which is pinned to the rod 34 as indicated at 52. Stretched between each rod 34 and the disc 48 is a spring 54, which normally maintains the block 50 against the top face of the disc and each rod end 35 just short of being projected through the bore 32 in mold 26. The sleeve 24 is rotatably mounted via roller bearings 58 in a collar 60 fixed to the upper end of a vertically translatable shaft 62 which is suitably driven by the machine.

Secured to a fixed part of the machine frame is a bored block 64 in which is rotatably mounted the stem 66 of an abutment disc 68. Preferably the disc is of a diameter sufficient to engage the upper ends of all of the elongated blocks 50 though the stem itself may be elongated to engage the top surface of the disc 48 on the upward travel of the upper press. When the upper press, see Figs. 1 and 2, is moved to its uppermost position by the upward travel of shaft 62, the abutment disc engages the upper ends of blocks 50 which depress the disc 48 against the action of spring 46. There is thus downward displacement of rods 34 relative to the sleeve 24, and the mold 26 carried thereby, so as to project the thin ends 35 of the rods through the bores of the mold, clearing the bores of any material which may be lodged in them.

On the downward motion of the upper press from the position of Fig. 2 to the position of Fig. 3, the finger 20 first engages with projection 18 on the lower rotating jaw, setting the upper press mold in rotation. The collar 22 is so set angularly with reference to the sleeve 24 that at this time the bores in the upper press are alined with the bores 14 in the lower mold. This setting of the upper mold into rotation occurs before the leads 16 have entered the bores in the mold 26.

As the upper press moves down from the position of Fig. 2 to the position of Fig. 3, the upper ends of the blocks 50 recede from the disc 68, and spring 46 expands forcing the disc 48 and the blocks 50 upwardly to withdraw the lower ends of the rods from the bores in the upper mold and to allow free entrance of the leads 16 into the upper mold bores. Continued motion downward of the collar 60 and sleeve 24, see Figs. 3 and 4, effects engagement of finger 20 with projection 18 on the lower rotating mold, setting the sleeve 24 and the upper mold into rotation. After such engagement still further continued downward motion of the upper press brings the lower ends 35 of the rods into yielding abutment with the tops of the leads 16, the springs 54 serving to press the leads down into their seats in the lower mold and preventing upward floating or dragging of the leads on initial upward movement of the upper press.

Having thus described the invention what is claimed is:

1. A press including a sleeve with means to reciprocate the same longitudinally of its axis, a mold at one end of the sleeve and a cap fixed at the other end thereof, said mold having a molding surface and passages extending therethrough to the molding surface, a compression spring seated by said cap, a member movable with respect to said cap urged away from said cap by said spring and restrained against excessive motion with respect to the cap, rods movable in said sleeve and having ends slidable in the passages in the mold, blocks affixed to the rods, a tension spring reacting between each rod and the member to urge the blocks toward engagement with the member, and an abutment operative in one direction of movement of the sleeve to force the member to move with respect to the cap against the action of the compression spring to thereby enable the ends of the rods to be moved by the tension springs to, at least, the molding surface of the mold.

2. A press including a sleeve with means to reciprocate the same, a mold having a molding surface at one end of the sleeve, a cap at the other end of the sleeve, alined passageways in said mold and cap, rods slidable in the passageways in the cap and having ends adapted to slide in the passageways in the mold, a spring housing on the cap having an inturned flange, a spring and a plate in the housing with the spring between the cap and plate and the plate urged by the spring against said inturned flange, said rods having blocks affixed thereto at the ends adjacent the plate, springs interposed between the plate and the rods to urge the blocks against the plate and an abutment on the press frame to engage the blocks on movement of the sleeve toward the abutment to compress the spring within the housing and force the rods through the passageways in the mold.

3. A press including a vertical sleeve with means to reciprocate the same, a mold at the lower end of the sleeve, a cap at the upper end of the sleeve, alined passageways extending through said cap and mold, rods slidable in the passageways in the cap and having ends projectable through the mold, a spring housing mounted on the cap, the upper end of which housing has an inturned flange, a spring seated on the bottom of said housing, a plate surmounting the spring and urged toward the inturned flange, blocks fastened to the upper ends of the rods, springs interposed between the upper ends of the blocks and the plate, and an abutment on the press having a plate engaging all of the blocks on upward movement of the sleeve to move the lower ends of the rods through the passages in the mold and against the action of the spring in the housing.

References Cited in the file of this patent
UNITED STATES PATENTS

| | | |
|---|---|---|
| 1,670,821 | Pawling et al. | May 22, 1928 |
| 2,195,483 | Franke | Apr. 2, 1940 |
| 2,321,224 | Madden et al. | June 8, 1943 |
| 2,380,042 | Hauton | July 10, 1945 |
| 2,504,842 | Juvinall et al. | Apr. 18, 1950 |
| 2,600,052 | Gartner et al. | June 10, 1952 |
| 2,618,904 | Gartner | Nov. 25, 1952 |
| 2,671,291 | Daley | Mar. 9, 1954 |